United States Patent
Marx

(10) Patent No.: US 11,609,754 B2
(45) Date of Patent: Mar. 21, 2023

(54) TOOL FOR LATENCY OPTIMIZED SYSTEM PLACEMENT

(71) Applicant: SAP SE, Walldorf (DE)

(72) Inventor: Andreas Marx, Reilingen (DE)

(73) Assignee: SAP SE, Walldorf (DE)

( * ) Notice: Subject to any disclaimer, the term of this patent is extended or adjusted under 35 U.S.C. 154(b) by 50 days.

(21) Appl. No.: 17/350,745

(22) Filed: Jun. 17, 2021

(65) Prior Publication Data
US 2022/0405072 A1 Dec. 22, 2022

(51) Int. Cl.
*G06F 8/60* (2018.01)

(52) U.S. Cl.
CPC ...................... *G06F 8/60* (2013.01)

(58) Field of Classification Search
CPC ........................................................ G06F 8/60
See application file for complete search history.

(56) References Cited

U.S. PATENT DOCUMENTS

| | | | |
|---|---|---|---|
| 11,038,778 B2 * | 6/2021 | Govindaraju | H04L 41/5029 |
| 11,405,329 B1 * | 8/2022 | Cuthbert | G06N 20/00 |
| 2010/0333081 A1 * | 12/2010 | Etchegoyen | G06F 8/60 717/172 |
| 2014/0052848 A1 * | 2/2014 | Clothier | G06F 8/60 709/224 |
| 2014/0278326 A1 * | 9/2014 | Sharma | G06F 9/5066 703/13 |
| 2014/0282402 A1 * | 9/2014 | Eksten | G06F 9/5072 717/123 |
| 2015/0244773 A1 * | 8/2015 | Wang | G06F 8/60 709/201 |
| 2018/0232220 A1 * | 8/2018 | Sharma | G06F 9/5066 |
| 2021/0058455 A1 * | 2/2021 | Kozhaya | H04L 47/805 |
| 2021/0168027 A1 * | 6/2021 | Parulkar | H04L 43/16 |

(Continued)

FOREIGN PATENT DOCUMENTS

| | | | | |
|---|---|---|---|---|
| CN | 107168742 A | * | 9/2017 | G06F 8/60 |

OTHER PUBLICATIONS

Patel et al., "CLITE: Efficient and QoS-Aware Co-location of Multiple Latency-Critical Jobs for Warehouse Scale Computers", 2020, IEEE (Year: 2020).*

(Continued)

*Primary Examiner* — Qing Chen
*Assistant Examiner* — Junchun Wu
(74) *Attorney, Agent, or Firm* — Buckley, Maschoff & Talwalkar LLC

(57) ABSTRACT

According to some embodiments, systems and methods are provided, comprising receiving, at a latency module, a request to provision a software system; determining a number of end-user locations; and in a case the determined number of end-user locations is one: determining a region of a data center for the determined end-user location; and deploying the software system to the determined region; and in a case the determined number of end-user locations is more than one: determining one or more non-technical parameters; determining one or more technical parameters; based on the determined one or more non-technical parameters and the determined one or more technical parameters, determining the region for the data center; and deploying the software system to the determined region. Numerous other aspects are provided.

13 Claims, 9 Drawing Sheets

(56) References Cited

U.S. PATENT DOCUMENTS

2022/0023755 A1*  1/2022  Vukojevic ............... H04L 67/63
2022/0200954 A1*  6/2022  Divekar .................. H04L 45/85
2022/0200957 A1*  6/2022  Prabagaran ......... H04L 61/5069
2022/0405072 A1*  12/2022  Marx ....................... G06F 8/60

OTHER PUBLICATIONS

Marshak et al., "Evaluating web user perceived latency using server side measurements", 2002, Elsevier Science B.V. (Year: 2002).*

Green et al., "Measurement of latency during real-time wireless video transmission for remote supervision of autonomous agricultural machines", Feb. 2021, Elsevier B.V. (Year: 2021).*

Tripathi et al., "Non-cooperative power and latency aware load balancing in distributed data centers", 2017, Elsevier Inc. (Year: 2017).*

Mukherjee et al., "Transmission and Computational Latency-aware Load Balancing for Fog Radio Access Networks", 2018, IEEE (Year: 2018).*

* cited by examiner

FIG. 3A

PING REQUESTS: LATENCY IN MILLISECONDS

| eu-nl-1a | eu-nl-1b | eu-ru-1a | eu-ru-1b | la-br-1a | la-br-1b | no-co-1a | no-co-1b | no-us-1a | no-us-1b | no-us-2a | no-us-2b | no-us-3a |
|---|---|---|---|---|---|---|---|---|---|---|---|---|
| 126.230 ms | 126.313 ms | 169.297 ms | 181.686 ms | 313.238 ms | 393.230 ms | 208.003 ms | 208.646 ms | 204.936 ms | 198.588 ms | 243.343 ms | 257.093 ms | 253.803 ms |
| 263.692 ms | 269.345 ms | 343.350 ms | 342.019 ms | 320.495 ms | 315.309 ms | 207.245 ms | 209.646 ms | 210.533 ms | 215.263 ms | 202.808 ms | 194.198 ms | 161.027 ms |
| 268.836 ms | 268.803 ms | 342.816 ms | 343.075 ms | 319.529 ms | 314.748 ms | 211.494 ms | 203.255 ms | 211.452 ms | 214.782 ms | 203.818 ms | 193.552 ms | 159.012 ms |
| 276.744 ms | 278.143 ms | 265.892 ms | 267.957 ms | 373.630 ms | 345.193 ms | 255.250 ms | 255.290 ms | 255.806 ms | 270.513 ms | 233.305 ms | 235.839 ms | 208.358 ms |
| 240.583 ms | 240.611 ms | 266.322 ms | 267.475 ms | 373.923 ms | 343.561 ms | 253.156 ms | 255.287 ms | 266.249 ms | 260.154 ms | 246.916 ms | 235.696 ms | 208.187 ms |
| 231.079 ms | 230.562 ms | 266.727 ms | 266.777 ms | 264.381 ms | 265.174 ms | 154.696 ms | 157.329 ms | 161.997 ms | 166.053 ms | 153.740 ms | 138.478 ms | 108.266 ms |
| 239.908 ms | 238.493 ms | 268.492 ms | 268.876 ms | 272.529 ms | 272.158 ms | 163.763 ms | 166.036 ms | 168.284 ms | 173.649 ms | 162.763 ms | 138.011 ms | 117.349 ms |
| 87.050 ms | 86.739 ms | 137.626 ms | 137.643 ms | 275.775 ms | 296.237 ms | 163.899 ms | 167.169 ms | 149.879 ms | 159.270 ms | 200.959 ms | 194.475 ms | 204.489 ms |
| 11.391 ms | 11.427 ms | 59.657 ms | 52.658 ms | 212.588 ms | 209.612 ms | 107.750 ms | 111.096 ms | 89.776 ms | 93.858 ms | 139.922 ms | 136.578 ms | 139.793 ms |
| 11.393 ms | 11.459 ms | 52.876 ms | 59.684 ms | 223.877 ms | 220.667 ms | 103.747 ms | 100.404 ms | 89.848 ms | 95.033 ms | 135.419 ms | 131.388 ms | 136.900 ms |
| 11.533 ms | 11.592 ms | 59.659 ms | 59.684 ms | 223.916 ms | 210.065 ms | 108.928 ms | 100.556 ms | 89.894 ms | 93.998 ms | 140.054 ms | 136.722 ms | 138.830 ms |
| | | | | | 96.668 ms | 93.403 ms | 95.668 ms | 807.680 ms | 91.854 ms | 137.803 ms | 134.599 ms | 143.983 ms |
| | | | | | 108.276 ms | 97.350 ms | 95.850 ms | 89.105 ms | 93.197 ms | 134.488 ms | 130.408 ms | 137.831 ms |
| 0.504 ms | 0.539 ms | 55.532 ms | 54.292 ms | 194.905 ms | 214.805 ms | 91.121 ms | 95.365 ms | 88.221 ms | 92.347 ms | 136.223 ms | 125.046 ms | 134.903 ms |
| 0.583 ms | 0.539 ms | 54.691 ms | 54.123 ms | 206.126 ms | 203.736 ms | 91.211 ms | 94.177 ms | 86.097 ms | 90.229 ms | 136.229 ms | 124.876 ms | 134.116 ms |
| 54.830 ms | 53.620 ms | 0.323 ms | 0.625 ms | 253.954 ms | 266.394 ms | 156.543 ms | 153.349 ms | 143.860 ms | 147.976 ms | 182.991 ms | 182.720 ms | 185.582 ms |
| 54.294 ms | 54.055 ms | 0.643 ms | 0.356 ms | 242.096 ms | 265.995 ms | 141.033 ms | 140.587 ms | 143.144 ms | 142.197 ms | 182.950 ms | 178.474 ms | 181.111 ms |
| 265.738 ms | 194.720 ms | 241.727 ms | 253.934 ms | 0.358 ms | 0.782 ms | 150.036 ms | 150.381 ms | 121.179 ms | 125.235 ms | 158.919 ms | 161.405 ms | 164.434 ms |
| 214.336 ms | 214.536 ms | 206.036 ms | 277.706 ms | 0.486 ms | 0.834 ms | 138.778 ms | 149.825 ms | 131.901 ms | 138.287 ms | 159.888 ms | 161.060 ms | 158.545 ms |
| 91.235 ms | 96.664 ms | 153.352 ms | 155.978 ms | 136.487 ms | 152.078 ms | 2.520 ms | 0.419 ms | 17.194 ms | 25.688 ms | 65.156 ms | 62.663 ms | 57.497 ms |
| 94.173 ms | 93.295 ms | 153.436 ms | 153.522 ms | 149.994 ms | 149.843 ms | 2.547 ms | 0.366 ms | 21.665 ms | 25.717 ms | 71.114 ms | 60.437 ms | 57.921 ms |
| 88.152 ms | 85.965 ms | 144.086 ms | 143.152 ms | 121.221 ms | 131.387 ms | 21.667 ms | 21.676 ms | 0.570 ms | 5.477 ms | 53.116 ms | 57.615 ms | 57.297 ms |
| 92.163 ms | 89.967 ms | 147.211 ms | 147.208 ms | 126.210 ms | 135.881 ms | 25.674 ms | 25.685 ms | 5.418 ms | 0.345 ms | 53.677 ms | 54.518 ms | 61.318 ms |
| 86.538 ms | 86.424 ms | 140.305 ms | 139.265 ms | 121.341 ms | 132.636 ms | 17.544 ms | 24.589 ms | 0.707 ms | 5.906 ms | 53.132 ms | 50.031 ms | 57.003 ms |
| 136.262 ms | 131.847 ms | 186.190 ms | 182.985 ms | 158.987 ms | 160.271 ms | 65.154 ms | 71.170 ms | 53.086 ms | 57.158 ms | 0.567 ms | 0.828 ms | 44.093 ms |
| 124.784 ms | 124.714 ms | 182.700 ms | 178.455 ms | 160.980 ms | 161.035 ms | 67.031 ms | 66.961 ms | 54.006 ms | 61.601 ms | 0.935 ms | 0.344 ms | 43.054 ms |
| 122.631 ms | 134.023 ms | 185.986 ms | 186.048 ms | 164.437 ms | 158.437 ms | 55.353 ms | 57.455 ms | 57.258 ms | 61.379 ms | 44.012 ms | 39.854 ms | 0.360 ms |

FIG. 3B

| REGION | LOCATION | PLATFORM | AVAILABLE DC TECHNICAL # | PRODUCT 1 | PRODUCT 2 |
|---|---|---|---|---|---|
| EMEA | ROT | CCD | CCD01 | X | X |
| EMEA | FRANKFURT | CCD | CCD22 | | X |
| EMEA | FRANKFURT | GCP | GCP22 | | X |
| NORTH AMERICA | COLORADO SPRINGS | CCD | CCD17 | X | |
| NORTH AMERICA | IOWA | GCP | GCP43 | X | |

FIG. 6

| | YEAR/MONTH-ROLLOUT START | 2021 JAN | | 2021-OCT | | 2022-JUL | | 702 |
|---|---|---|---|---|---|---|---|---|
| | NO. OF TRANSACTIONS GENERATED | THAILAND | INDONESIA | INDIA | EGYPT | GREECE | ROMANIA | |
| NEW | PURCHASE ORDER LINE ITEMS GENERATED PER MONTH | 10,000 | 6,000 | 9000 | 2,000 | 15,000 | 22,000 | |
| | SALES ORDER LINE ITEMS GENERATED PER MONTH | 38,000 | 12,000 | 40,000 | 4,000 | 37,000 | 51,000 | |

| | | 2021 JAN | | 2021-OCT | | 2022-JUL | | 704 |
|---|---|---|---|---|---|---|---|---|
| USER TYPE | TOTAL NUMBER OF USERS | THAILAND | INDONESIA | INDIA | EGYPT | GREECE | ROMANIA | |
| ACTIVITY USERS | 122 | 27 | 22 | 12 | 6 | 8 | 15 | |
| PRODUCTIVITY | 225 | 25 | 25 | 25 | 25 | 25 | 25 | |
| PROFESSIONAL | 20 | 2 | 3 | 2 | 2 | 2 | 2 | |
| PROFESSIONAL | 53 | 5 | 9 | 7 | 4 | 4 | 4 | |
| PROFESSIONAL | 10 | | | | | | | |
| PROFESSIONAL | 42 | | | | | | | |
| | 472 | 59 | 59 | 46 | 37 | 39 | 46 | |

FIG. 7

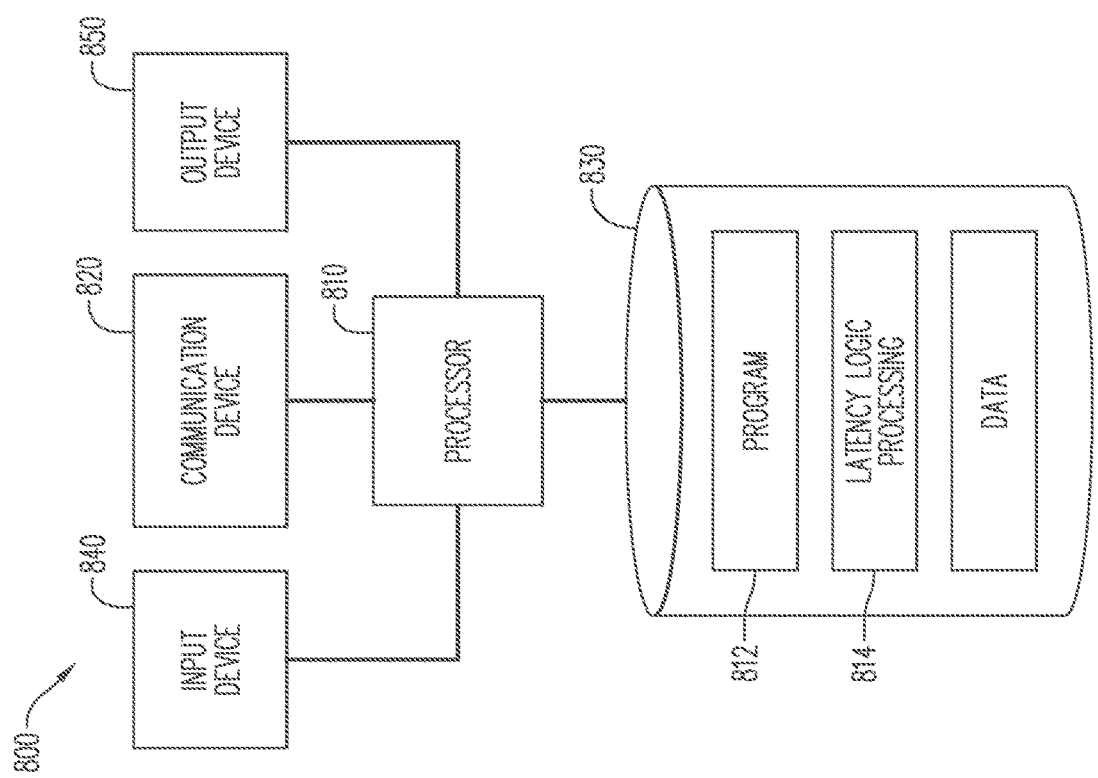

TOOL FOR LATENCY OPTIMIZED SYSTEM PLACEMENT

BACKGROUND

Organizations make use of software systems, which are installed and run on computers or servers. The computers or servers may be on the premises of the organization or the software systems may be at a remote facility such as a server farm or cloud. Provisioning may refer to the steps to manage access to data and resources and make the data and resources available to users and systems via the software systems. Conventionally, IT infrastructure for these software systems may be provisioned or set up at a major location for the organization, such as the organization's headquarters. However, the headquarters may not be the location for a majority of the users of the system and/or where a majority of the work is executed (workload). The distance between the provisioned location and the majority of users/workload may affect the latency or speed of the system.

Systems and methods are desired which support selection of a target location for the system while minimizing latency for an end-user.

BRIEF DESCRIPTION OF THE DRAWINGS

Figure 3A:
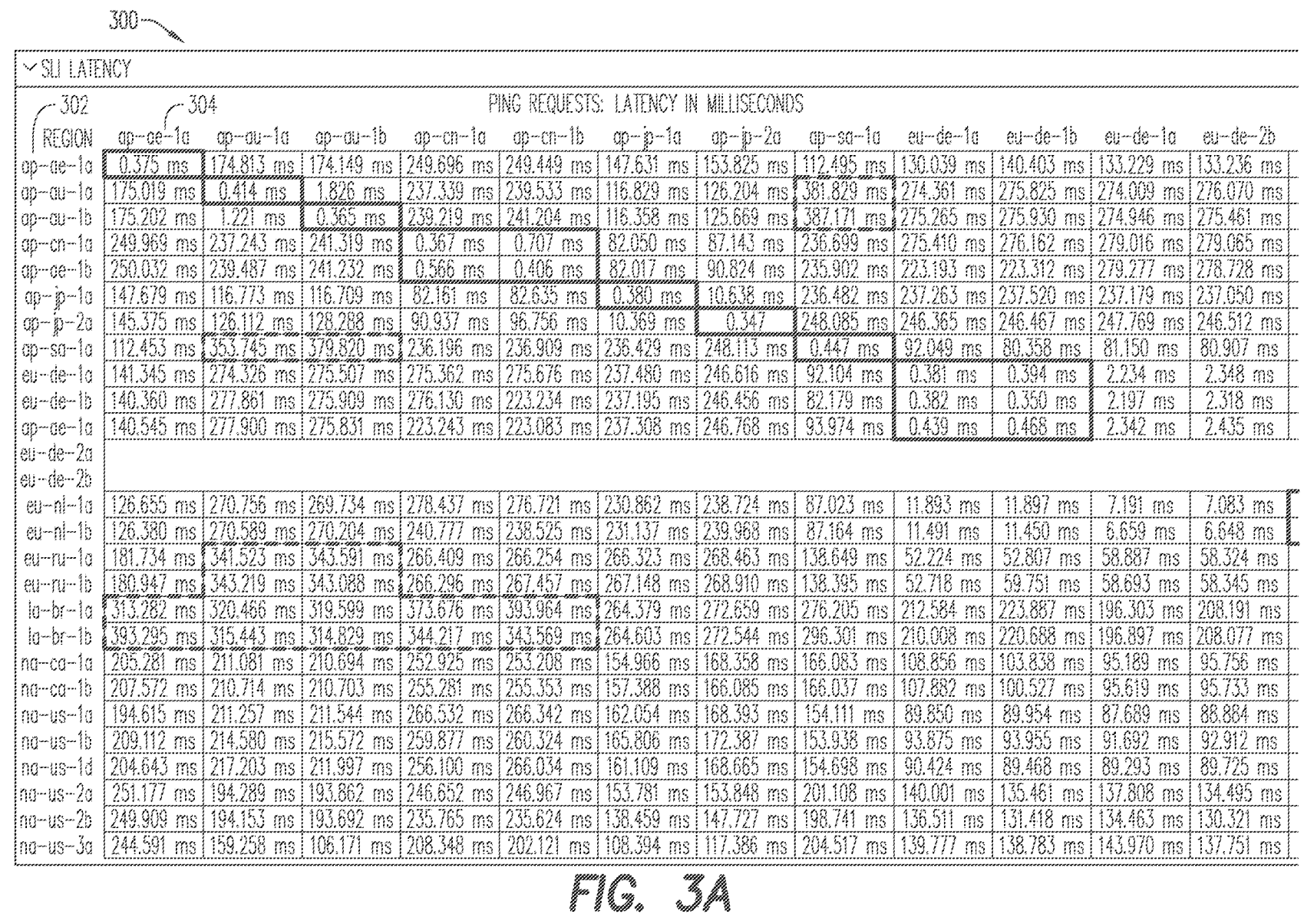

FIG. 3A is a non-exhaustive example of a map according to some embodiments.
FIG. 3B is a continuation of the map in FIG. 3A according to some embodiments.
FIG. 6 is a non-exhaustive example of a product availability chart according to some embodiments.
FIG. 7 is a non-exhaustive example of a user interface according to some embodiments.
FIG. 8 is a block diagram of a system according to some embodiments.

DETAILED DESCRIPTION

Figure 1:
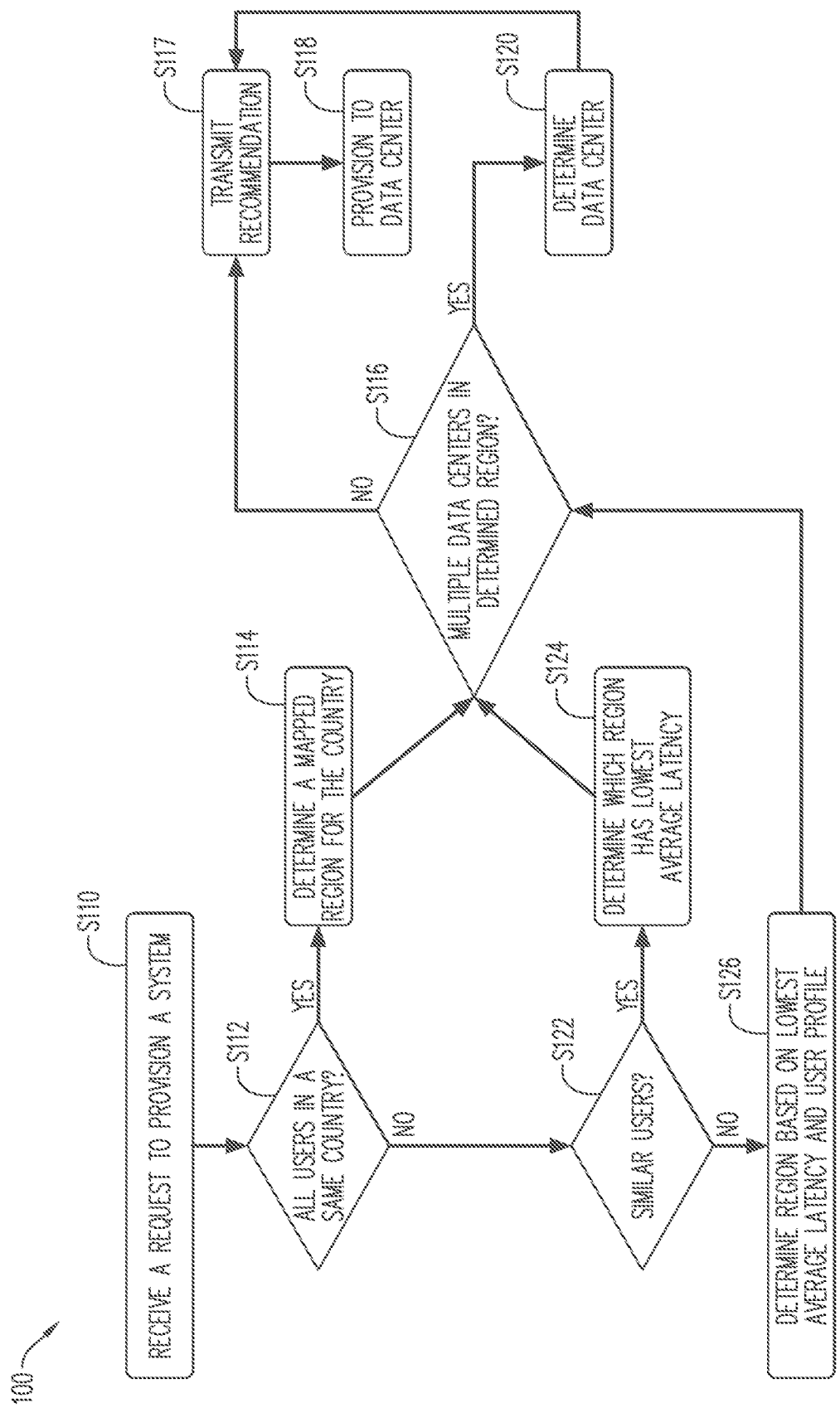
FIG. 1 is a flow diagram according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) to implement the specific techniques set forth herein.

An organization may have a software system provisioned for use by the organization. The organization may be located in a same or different location as the majority of users of the system ("customer users") and/or where the majority of the workload is executed. Conventionally the software system may be provisioned at a same location as the headquarters. As used herein, "same location" may refer to the closest data center that hosts the software system. This "same location" may be a same country or a different country, depending on whether the country that houses the headquarters also houses the data center. When this location is different from the location of the majority of users and/or workload execution, there may be an increase in latency as compared to when the location is the same. Latency is the delay between a customer user's action and an application's response to that action, and may be referred to as the total round trip time it takes for a data packet to travel from customer user action to application response and back to feedback to customer user. The further apart two locations or nodes (e.g., user executing/receiving an action and an application executing/receiving an action) are, the more latency there is as latency may be dependent, in part, on the distance between the two communicating nodes. Latency may generally be measured in milliseconds (ms).

As a non-exhaustive example an organization having multiple locations would like to provision a software system. The organization may be headquartered in Germany, while the majority of customer users will be in the Asia Pacific and Japan (APJ) region, and a limited number of transactions are predicted to be triggered from eastern Europe. Conventionally, the software system would be provisioned in Germany, and to access the system, the data packets from the APJ region and Eastern European region would travel therefrom to Germany, and these data packets would have a higher latency than the data packets traveling from Germany to Germany. As such, the majority of the customer users of the system would experience more latency than the minority of the customer users located closer to the headquarters.

One or more embodiments provide a latency module to determine where a software system should be provisioned for an organization to experience a lowest average latency based on organization requirements and technical capabilities. The latency module may first determine where a customer/user is located, and then which data centers are assigned to those users. Then the latency module may determine a minimum average latency based on a customer user profile that includes both non-technical ("customer user") parameters (e.g., amount of customer users per location, number of transactions planned per location, legal constraints, etc.) and technical parameters (e.g., latency between regions, available regions, IaaS capabilities, etc.). As a non-exhaustive example, country X maps to this latency region and then based on the regions (in a case a decision is being made between at least two regions), the latency module takes the latency between the regions from a latency map into consideration for assignment.

FIGS. 1-7 include a flow diagram of a process 100 (FIG. 1) and 200 (FIG. 2) for determining a location to provision a system, and selecting a data center, respectively, according to some embodiments. Process 100/200 may be executed by application server 540 according to some embodiments. In one or more embodiments, the application server 540 may be conditioned to perform the process 100/200, such that a processor 810 (FIG. 8) of the server 540 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

User interface 400/700 may be presented on any type of display apparatus (e.g., desktop monitor, smartphone display, tablet display) provided by any type of device (e.g., desktop system, smartphone, tablet computer). One or more embodiments may include a UI renderer (not shown) which is executed to provide user interface 400/700 and may comprise a Web Browser, a standalone application, or any other application. Embodiments are not limited to user interface 400/700 of FIG. 4/7, respectively.

Prior to the start of the process 100, a map 300 (FIGS. 3A/3B) is received by the latency module 502. The map 300 is a latency map that shows a measured latency in milliseconds for a request to be transmitted ("pinged") from a first region 302 to a second region 304 and back to the first region. The regions listed landscapes on which deliver the customer product. It is noted that different cloud platforms, or other platforms, may have already-defined latency maps for use by their respective platform. The latency module 502 may also receive, prior to the start of the process 100, a data center assignment table 510. The data center assignment table 510 assigns each country and/or city to a given data center 607 (FIG. 6). The assignment is based on the available data centers that are closest to the country. It is noted that "available" may refer to whether the data center exists and whether it has enough resources to receive the products. As a non-exhaustive example, S4HANA/Cloud®, assigned to the assignee of the instant specification, may be received by eight possible data centers. A data center 607 is where the computing inventory is located. A hyperscaler (e.g., Microsoft's Azure, Amazon's AWS etc.) is an operator of a data center that offers scalable computing services. In some embodiments, a region or country may not have any data center located therein at all, or may have a data center but not one that can support the product. In this case, the country is assigned to the geographically closest data center. As a non-exhaustive example, Germany may have three data centers located therein, while Greece does not have any data centers located therein, and instead is assigned to a data center in Italy.

Figure 4:
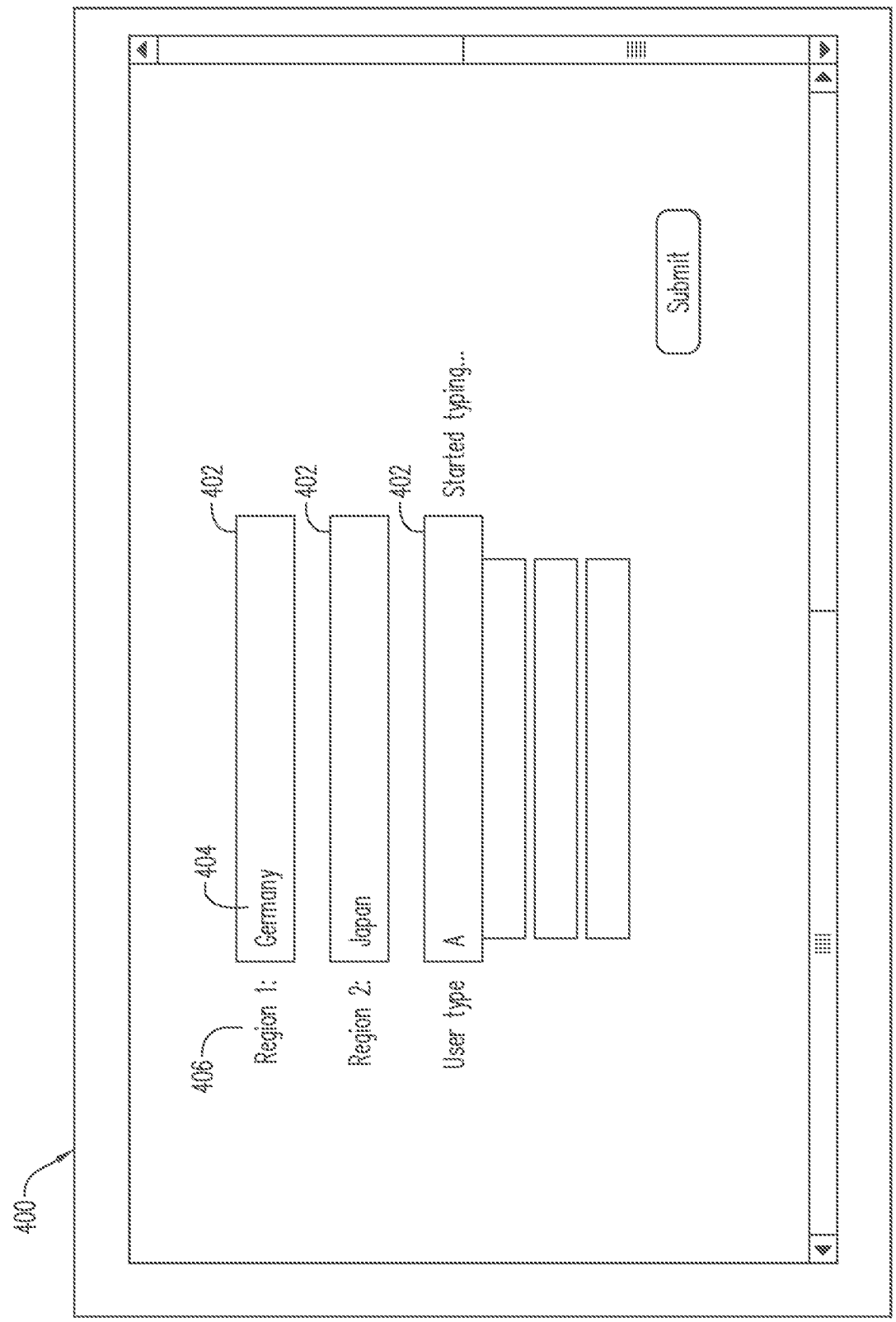
FIG. 4 is a non-exhaustive example of a user interface according to some embodiments.

Initially at S110, a request 504 is received at the latency module 502. The request may be to determine a location at which to provision a system and may be received from a client/user 550 via a User Interface (UI) 400 (FIG. 4). It is noted that as used herein, the "client/user" may be a direct user of the latency module, which may be different than the customer user who the system is being assigned/provisioned for. The latency module 502 may also receive parameters 406. The parameters may be at least one of technical parameters 506 and non-technical parameters 508. The UI 400 may include one or more fields 402 to receive data 404, where each field 402 represents a non-technical parameter 508. The fields 402 may be free form user-entry fields, drop-down fields, radio buttons, or any other suitable fields to receive data. The technical parameters 506 may be part of the background information and may be determined by latency measures. For example, the technical parameters 506 may be tied to a region/location and/or the data center.

The technical parameters 506 may include, but are not limited to, a latency map 300, a latency between data centers per the map 300, availability status for region (e.g., regions that are available for system provisioning), IaaS/platform capabilities (e.g., what type of resources (e.g., virtual machine) are available; dedicated type of a virtual instance). It is noted that as used here, the term "region" may be used to represent a collection of 1-n data centers (which may be referred to as "Availability Zone") that are close by each other and form a region. The latency map 300 may be dynamic and updated to include the most recent latency times. The latency map 300 is chosen by the platform, location and time it is used. Regarding the regions that are available for system provisioning, it is noted that a given region may or may not have a data center that would allow the region to serve as a location to receive a provisioned system 512. Another user-selectable technical parameter may be a particular cloud platform. Each cloud platform may include boundary conditions of the platform on which the system will be provisioned. For example, the cloud platform that the user of the latency module may want the system provisioned on may not be available for a given data center within a region having lowest latency. As a non-exhaustive example, SAP's Converged Cloud (CCEE) may not have all regions enabled for deployment, and there may be differences between products; Google's Google Cloud Platform (GCP) and Microsoft's Azure Cloud may only have a few regions enabled, but may support all projects available in those enabled regions; ACS's ACS Cloud may be enabled on only one region, but may support all projects available in that region. For example, on a cloud platform there are no certified terabyte one instances available, and this is platform specific and may different between the different cloud products. The different cloud products have different requirements with regards to infrastructure. As another non-exhaustive example, FIG. 6 provides a product availability chart 600. The chart 600 lists the region 602, location 604 within the region, the platform supported at the location 606, the data center 607 available in that location 608, the availability of product 1 (610), and the availability of product 2 (612).

The non-technical parameters 508 may include, but are not limited to, an amount of customer users per location, a number of transactions planned per location, customer user profile, legal constraints, etc. In some embodiments, the number of transactions may include the sub-category of transaction type. A given transaction type may be associated with a particular transaction size, which may affect the latency. It is noted that transaction type is an example of a parameter to be determined to represent the workload. These non-technical parameters 508 may be a vehicle to determine how much traffic will be created out of a dedicated region (e.g., the effect of provisioning/deploying the system to that region). This determination may be used with the latency determination to determine the impact of the latency. As a non-exhaustive example, the more a customer does in a country (e.g., the more transactions/the bigger the transactions), it may be more impactful if there is a high latency, in terms of the effect on the customer. The customer user profile may include the type of customer user (a developer, a power user, a standard user, a professional user), and how many of each type of customer user are located in each location. Each customer user type may be associated with a type of work executed thereby. For example, a power user may execute system configurations and perform tasks on the backend of the system, while a standard user may execute operations on the front end of the system, they may have no administration rights, they may not be involved with process optimization, they may have no backend access, and a professional user may execute operations that involve both the back end and front end of the deployed/provisioned system. The legal constraints may refer to requirements by the customer user to have the system under a particular legal entity. As a non-exhaustive example, the customer user may want the system to adhere to the rules of the European Union Data Protection (EUDP) Agency, and so when the latency module 502 determines a region, the module 502 may limit the system region to some place in the European Union.

FIG. 7 is another non-exhaustive example of a user interface 700. This user interface 700 includes a first section 702 for transaction data and a second section 704 for customer user data. The data in each of the first section 702 and the second section 704 is arranged by year and region. For example, in January 2021, Thailand has 10,000 purchase order line items, while it is expected that India will have 9000 purchase order line items in October 2021.

Turning back to the process 100, it is determined at S112 whether all of the customer users are in a same country that is assigned to a given data center ("end-user location"). The end-user location is a geographical location a customer user will be located during execution of the provisioned software system. This end-user location is assigned to a particular data center. In a case it is determined at S112 that all of the customer users are in the same country, a mapped region for the country is determined at S114. The latency module 502 may analyze the data center assignment table 510 to determine the mapped region for the country. The latency module 502 may then in S116 determine whether there are multiple data centers in the determined region. In a case there is only one determined data center, the process continues to S117 and the latency module 502 transmits the existing data center 607 to the client 550 as a recommendation. Then in S118 the system 512 is deployed/provisioned in that existing data center. As a non-exhaustive example, an organization's headquarters is the United States, and the customer users are in the United States, the system may be provisioned in NA-US-1, which is the mapped region for the United States per the data center assignment table.

In a case it is determined at S116 there are multiple data centers in the determined region, the process continues to S120, and the latency module 502 determines which data center to deploy/provision the system 512 to, as described further below with respect to FIG. 2. Then the process 100 continues to S117 and the latency module 502 transmits the existing data center 607 to the client 550 as a recommendation. Then in S118 the system is deployed/provisioned to the determined data center.

In a case it is determined at S112 that all of the customer users are not in the same country, the process continues to S122 and it is determined if the customer users in each country are similar (e.g., whether the users in country A are similar to the users in country B). In one or more embodiments, customer users are similar when they need a same type of access per their customer user profile (e.g., power, standard, professional, etc.). It is noted that in some instances, the user profile may not be received, and in that case the determination where to deploy/provision the system may be based on a comparison using the number of customer users in each country relative to the latency. In a case it is determined at S122 that the customer users are similar, the process 100 continues to S124, and it is determined which of the regions associated with each of the multiple countries has a lowest average latency. In one or more embodiments, the latency module 502 may analyze the latency map 300 to determine which region has the lowest average latency. Next, the process 100 continues to S116 to determine whether there are multiple data centers in the determined region, as described above.

As a non-exhaustive example, consider a scenario where the organization has its headquarters in the United States with customer users as follows: ten in the United States, forty in France and ten in the United Kingdom. All of the customer users are the same type. Conventionally, the system would be provisioned in region NA-US-1, since this is the region assigned to the United States, where the organization is headquartered. Based on the one or more embodiments, the latency module 502 may determine the system should be provisioned to a data center in the region EU-DE-2. It is noted that the system may be provisioned to a data center in EU-DE-2 instead of EU-DE-1 because EU-DE-1 may not have available infrastructure/space to host the system. This determination is based on a calculation of average latency for each area where customer users are located. It is noted that based on the map, France and the United Kingdom are assigned to the same region. For region EU-DE-2, based on the map 300, the latency for United States (US) is 87.68 ms, the latency for France (FR) is 0.789 and the latency for United Kingdom (UK) is 0.789. As such, the lowest average latency for EU-DE-2 is ((10 US*87.68)+(40FR*0.789)+(10UK*0.789))/60=15.27 ms, where "60" is the number of users. Alternatively, if the system was provisioned in NA-US-1, the average latency would be 73.16 ms (((10US*0.57)+(40FR*87.68)+(10UK*87.68))/60). It is noted that with increasing numbers of countries and customer user profiles, the calculation is exceedingly more complex.

In a case it is determined at S122 that the customer users are dissimilar, the process 100 continues to S126 and a region is determined based on: 1. Which region has the lowest average latency, 2. the non-technical parameters 508 of customer user profile, and 3. at least one of: an amount of customer users per location, a number of transactions planned per location, and legal constraints. In one or more embodiments, the latency module 502 may use the non-technical parameters 508 (e.g., customer user profile, customer preferences) in addition to the lowest average latency per the latency map 300 to determine a region. Also, a preference for a region (non tech param) for whatever reason—place priority on one region. In some embodiments, at least one of the non-technical parameters 508 may have a weight associated therewith, and the latency module 502 may use the weight in determining a region. As a non-exhaustive example, the type of customer user may be weighted such that a developer has a weight of 0.5, a power user has a weight of 1, a standard user has a weight of 5 and a professional user has a weight of 30. Next, the process 100 continues to S116 to determine whether there are multiple data centers in the determined region, as described above. For example, Germany may have two data centers.

Figure 2:
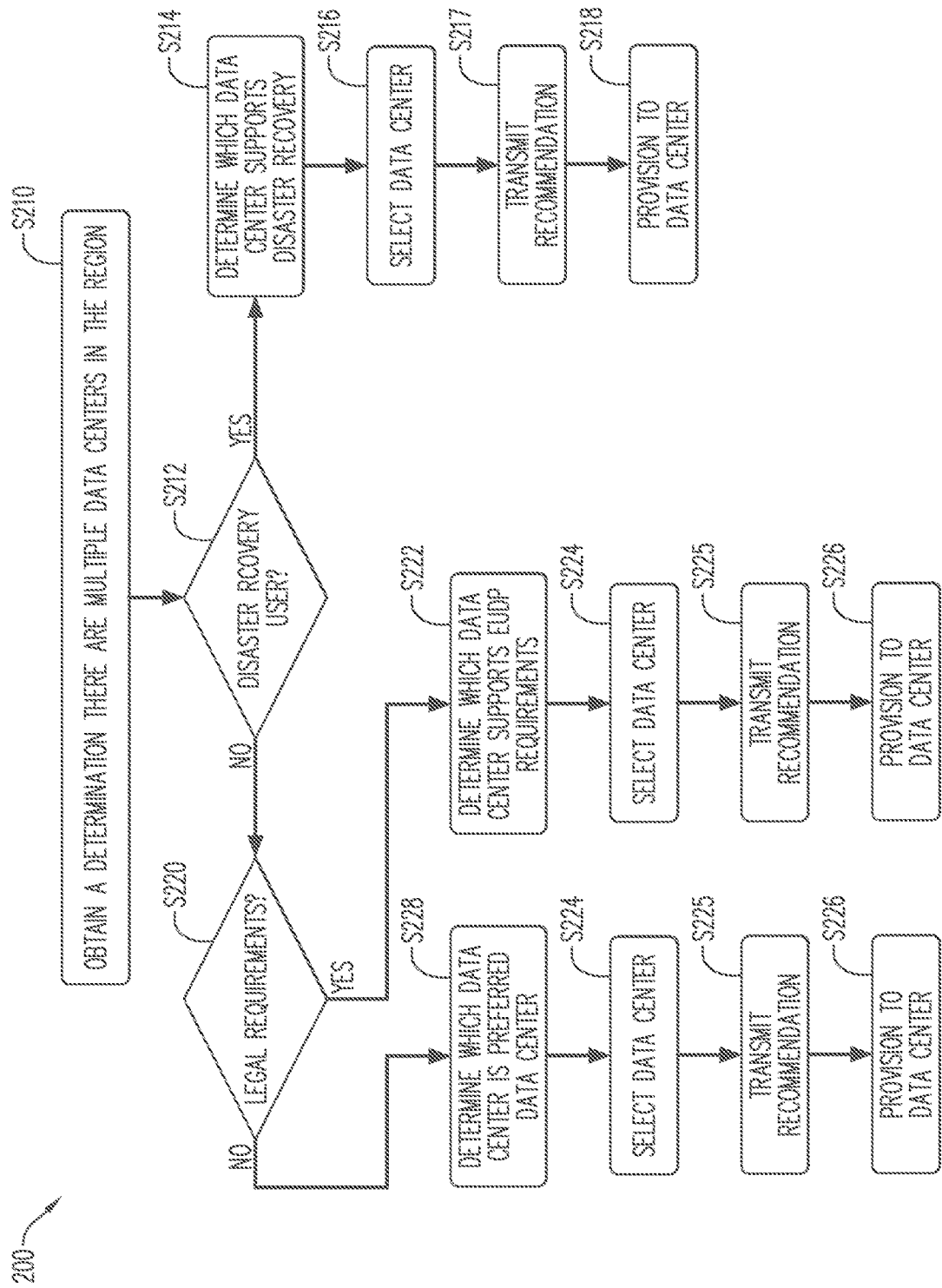
FIG. 2 is a flow diagram according to some embodiments.

Turning to FIG. 2, a process 200 is provided for determining which data center 607 to deploy/provision the system to in the case it is determined at S116 there are multiple data centers in the determined region. In a case there are multiple data centers in the region, other parameters may be used to determine where to deploy/provision the system. As a non-exhaustive example, the data center may be provided by different providers, and different data centers may better support different products, or may have different costs associated therewith. For example, in the United States there may be three data centers, but only one data center is used to provision new systems, while the other two data centers are for other cloud products. The latency map may include all three data centers, but the latency module 502 may not choose the one with the lowest latency because it may not have the features needed to provision/deploy the system. Another example of "other" parameters to determine where to deploy/provision the system may be latency. Initially at S210, a determination that there are multiple data centers in a region is obtained. This determination may be based on the data center assignment table. Next, in S212, it is determined whether the customer user is a disaster recovery user. A disaster recovery user is a customer user that elects to have a disaster recovery solution. A disaster recovery solution relates to the case of a disaster (e.g., thunderstorm results in a power outage, an earthquake destroys a data center, etc.), data redundancy is provided by another data center that fulfills certain requirements (e.g., is 150 km away from the data center experiencing the disaster). It is noted that the election of the disaster recovery solution may limit the data centers that may be selected by the latency module 502 to deploy/provision the system. The disaster recovery determination may be based on input received at the UI 400 as part of the request 504, or via any other suitable determination.

In a case it is determined in S212 the customer user is a disaster recovery user, the process 200 proceeds to S214, and the latency module 502 determines which data center(s) in the region support disaster recovery. For example, some platforms may support disaster recovery (e.g., SAP's Converged Cloud (CCEE)), while others (e.g., Google's Google Cloud Platform (GCP), ACS's ACS Cloud, Microsoft's Azure Cloud) may not support disaster recovery. Then in S216, the latency module 502 selects a data center, and the process 200 continues to S217 where the latency module 502 transmits the selected data center 607 to the client 550 as a recommendation. The system is provisioned to the selected data center at S218. It is noted that in a case there is more than one data center that supports disaster recovery, the latency module 502 may select the data center with the lowest latency, assuming all data centers are equally available.

In a case it is determined at S212 that the customer user is not a disaster recovery user, the process 200 proceeds to S220, and it is determined if the customer user has legal requirements. As a non-exhaustive example, a legal requirement may be the European General Data Protection (EUGDP) requirements. EUGDP requirements are the legal requirements with respect to data protection. In particular the EUGDP requirements may state that customer data that is generated within the EU borders is not allowed to leave the borders of the EU; and also, people outside the EU are not allowed to operate on the system keeping the data. The EUDP requirement determination may be based on input received at the UI 400 as part of the request 504, or via any other suitable determination.

In a case it is determined at S220 the customer user has EUDP requirements, the process 200 proceeds to S222, and the latency module 502 determines which data center(s) in the region support EUDP. Then in S224, the latency module 502 selects a data center and continues to 225 where the latency module 502 transmits the selected data center to the client as a recommendation. The system is provisioned to the selected data center at S226. It is noted that in a case there is more than one data center in the region that supports the rules/requirements, the latency module 502 may select the data center with the lowest latency.

In a case it is determined at S220 that the customer user does not have EUDP requirements, the process 200 proceeds to S228, and the latency module 502 determines which data center is a preferred data center. Then in S224, the latency module 502 selects a data center and continues to 225 where the latency module 502 transmits the selected data center to the client as a recommendation. The system is provisioned to the selected data center at S226. The determination of a preferred data center may be based on at least one of: capacity available at the data center, contracts to be fulfilled with partners, priorities of the customer user (e.g., a customer user may have preferences due to locale, and these preferences may have a weighted factor used by the latency module 502 in making the determination), integration scenarios (e.g., a customer user may have a preference due to locations having already deployed systems, and these preferences may have a weighted factor used by the latency module 502 in making the determination), and one or more rules received by the latency module prior to execution of the process 200. As a non-exhaustive example, if the customer user already has products in a data center that may be integrated with the system to be provisioned/deployed, this (the integration points) may be a reason to deploy/provision the system to this data center, even if this data center may not have the lowest latency per the user profile. In one or more embodiments, the priorities of the customer user and the integration scenarios may be received as input (e.g., part of the request) at the user interface 400 prior to execution of the process.

Figure 5:
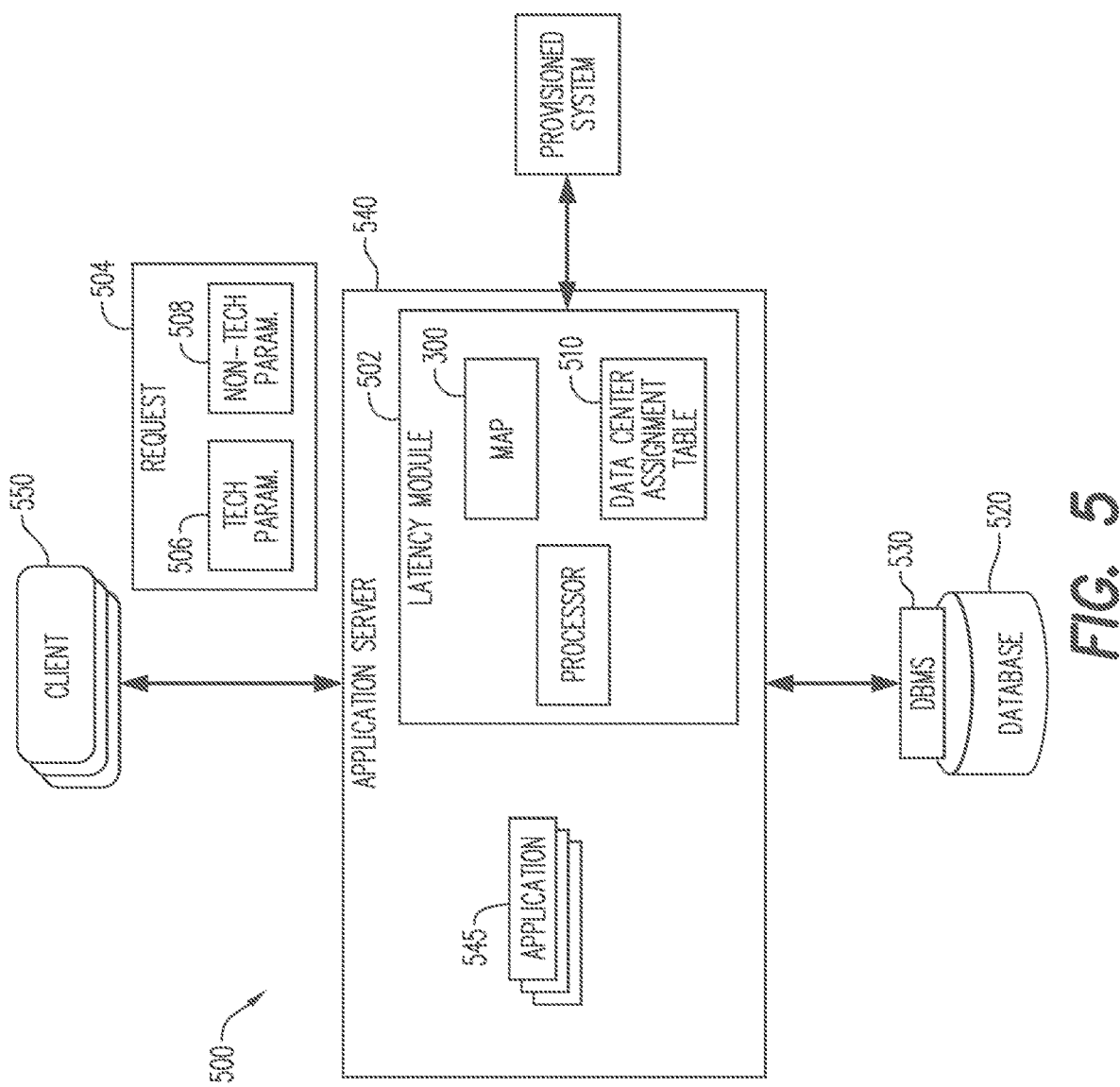
FIG. 5 is a block diagram of a system architecture according to some embodiments.

FIG. 5 is a block diagram of system architecture 500 according to some embodiments. Embodiments are not limited to architecture 500 or to a three-tier storage architecture. One or more components of the system architecture 500 may be located remote from one another and one or more components may be allocated in a cloud-computing environment. Such a cloud computing environment may elastically allocate and de-allocate compute (e.g., virtual machines) and storage (e.g., file-based, block-based, object-based) resources depending on demand, cost and/or other factors.

Architecture 500 includes a latency module 502, a database 520, a database management system (DBMS) 530, an application server 540, application(s) 545, and clients 550. Applications 545 may comprise server-side executable program code (e.g., compiled code, scripts, etc.) executing within application server 540 to receive queries/requests 504 from clients 550 and provide results (recommended region/data center) to clients 550 based on data of database 520 and the output of the latency module 502. A client 550 may access the latency module 502 executing within application server 540, to generate the user interfaces 400 and 700 to determine where a system should be provisioned.

Application server 540 provides any suitable interfaces through which the clients 550 may communicate with the latency module 502 or applications 545 executing on application server 540. For example, application server 540 may include a HyperText Transfer Protocol (HTTP) interface supporting a transient request/response protocol over Transmission Control Protocol/Internet Protocol (TCP/IP), a Web Socket interface supporting non-transient full-duplex communications which implement the Web Socket protocol over a single TCP/IP connection, and/or an Open Data Protocol (OData) interface.

One or more applications 545 executing on server 540 may communicate with DBMS 530 using database management interfaces such as, but not limited to, Open Database Connectivity (ODBC) and Java Database Connectivity (JDBC) interfaces. These types of applications 545 may use Structured Query Language (SQL) to manage and query data stored in database 520.

DBMS 530 serves requests to retrieve and/or modify data of database 520, and also performs administrative and management functions. Such functions may include snapshot and backup management, indexing, optimization, garbage collection, and/or any other database functions that are or become known. DBMS 530 may also provide application logic, such as database procedures and/or calculations, according to some embodiments. This application logic may comprise scripts, functional libraries and/or compiled program code. DBMS 530 may comprise any query-responsive database system that is or becomes known, including but not limited to a structured-query language (i.e., SQL) relational database management system.

Application server 540 may be separated from, or closely integrated with, DBMS 530. A closely-integrated application server 540 may enable execution of server applications 545 completely on the database platform, without the need for an additional application server. For example, according to some embodiments, application server 540 provides a comprehensive set of embedded services which provide end-to-end support for Web-based applications. The services may include a lightweight web server, configurable support for OData, server-side JavaScript execution and access to SQL and SQLScript.

Application server 540 may provide application services (e.g., via functional libraries) which applications 545 may use to manage and query the data of database 520. The application services can be used to expose the database data model, with its tables, hierarchies, views and database procedures, to clients. In addition to exposing the data model, application server 540 may host system services such as a search service.

Database 520 may store data used by at least one of: applications 545 and the latency module 502. For example, database 520 may store one or more tables/maps accessed by the latency module 502 during execution thereof.

Generally, the system architecture 500 manages data of a database instance which is persisted in the database 520. The database 520 may be stored on-premise or on a cloud platform. Embodiments may utilize more than one database. In some embodiments, the database may utilize one or more block storage devices and/or object store. As is known in the art, block storage device persists system files and database pages which belong to any file-based database spaces managed by the system architecture 500. Object store, on the other hand, persists database pages which belong to any cloud-based database spaces managed by the system architecture 500. Database 520 may comprise any query-responsive data source or sources that are or become known, including but not limited to a structured-query language (SQL) relational database management system. Database 520 may comprise a relational database, a multi-dimensional database, an extensible Markup Language (XML) document, or any other data storage system storing structured and/or unstructured data. The data of database 520 may be distributed among several relational databases, dimensional databases, and/or other data sources. Embodiments are not limited to any number or types of data sources.

In some embodiments, the data of database 520 may comprise one or more of conventional tabular data, row-based data, column-based data, and object-based data. Moreover, the data may be indexed and/or selectively replicated in an index to allow fast searching and retrieval thereof. Database 520 may support multi-tenancy to separately support multiple unrelated clients by providing multiple logical database systems which are programmatically isolated from one another.

Database 520 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 550 may comprise one or more individuals or devices executing program code of a software application for presenting and/or generating user interfaces to allow interaction with application server 540. Presentation of a user interface as described herein may comprise any degree or type of rendering, depending on the type of user interface code generated by application server 540.

For example, a client 550 may execute a Web Browser to request and receive a Web page (e.g., in HTML format) from a website application 545 of application server 540 to provide the UI 400/700 via HTTP, HTTPS, and/or Web Socket, and may render and present the Web page according to known protocols. The client 550 may also or alternatively present user interfaces by executing a standalone executable file (e.g., an .exe file) or code (e.g., a JAVA applet) within a virtual machine.

FIG. 8 is a block diagram of apparatus 800 according to some embodiments. Apparatus 800 may comprise a general- or special-purpose computing apparatus and may execute program code to perform any of the functions described herein. Apparatus 800 may comprise an implementation of one or more elements of system 500. Apparatus 800 may include other unshown elements according to some embodiments.

Apparatus 800 includes latency processor 810 operatively coupled to communication device 820, data storage device 830, one or more input devices 840, one or more output devices 850 and memory 860. Communication device 820 may facilitate communication with external devices, such as application server 540. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to manipulate graphical user interfaces and to input information into apparatus 800. Output device(s) 850 may comprise, for example, a display (e.g., a display screen) a speaker, and/or a printer.

Data storage device/memory 830 may comprise any device, including combinations of magnetic storage devices (e.g., magnetic tape, hard disk drives and flash memory), optical storage devices, Read Only Memory (ROM) devices, Random Access Memory (RAM), cloud platforms (e.g., cloud object stores, cloud-based block storage devices,) etc.

The storage device 830 stores a program 812 and/or latency platform logic 814 for controlling the processor 810. The processor 810 performs instructions of the programs 812, 814, and thereby operates in accordance with any of the embodiments described herein, including but not limited to process 100/200.

The programs 812, 814 may be stored in a compressed, uncompiled and/or encrypted format. The programs 812, 814 may furthermore include other program elements, such as an operating system, a database management system, and/or device drivers used by the processor 810 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 500 may include a processor to execute program code such that the computing device operates as described herein.

All systems and processes discussed herein may be embodied in program code stored on one or more computer-readable non-transitory media. Such non-transitory media may include, for example, cloud computing, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A computer-implemented method comprising:
   receiving, at a latency module, a latency table, the latency table including a measured latency in transmission between a first region and a second region;
   generating a data center assignment table including each of a plurality of end-user locations assigned to a data center;
   receiving, at the latency module, a request to provision a software system for one or more end-user locations, wherein the request is received after receipt of the latency table and generation of the data center assignment table;
   determining, based on the request, a number of end-user locations as one end-user location or more than one end-user location;
   determining a region for each end-user location in the determined number of end-user locations, the determination further comprising:
      determining one or more weighted non-technical parameters for the determined more than one end user locations, wherein the one or more weighted non-technical parameters comprise at least one of: an amount of customer users per location, a number of transactions planned per location and a customer type; and
      determining one or more technical parameters for the determined more than one end-user locations;
   identifying one or more data centers in the determined region based on the data center assignment table;
   recommending one of the one or more identified data centers; and
   deploying the software system to the recommended data center.

2. The computer-implemented method of claim 1, wherein the end-user location is a geographical location a customer user will be located during execution of the provisioned software system.

3. The computer-implemented method of claim 1, wherein the one or more technical parameters comprise at least one of: a latency between regions; availability status of the region; and platform capabilities.

4. The computer-implemented method of claim 1, wherein the first region and the second region may be a same region or a different region.

5. The computer-implemented method of claim 1, wherein in the case the determined number of end-user locations is more than one:
   determining at least one customer user preference; and
   selecting the data center based on the determined: at least one customer user preference, one or more non-technical parameters, and one or more technical parameters.

6. A system comprising:
   a display;
   a latency module;
   a memory storing processor-executable steps; and
   a latency processor operative with the latency module to execute the processor-executable steps to cause the system to:
      receive a latency table including a measured latency in transmission between a first region and a second region;
      generate a data center assignment table including each of a plurality of end-user locations assigned to a data center;
      receive a request to provision a software system for one or more end-user locations, wherein the request is received after receipt of the latency table and generation of the data center assignment table;
      determine, based on the request, a number of end-user locations as one end-user location or more than one end-user location;
      determine a region for each end-user location in the determined number of end-user locations, the determination further comprising processor-executable steps to:
         determine one or more weighted non-technical parameters for the determined more than one end user location, wherein the one or more weighted non-technical parameters comprise at least one of: an amount of customer users per location, a number of transactions planned per location and a customer type; and
         determine one or more technical parameters for the determined more than one end-user locations;
      identify one or more data centers in the determined region based on the data center assignment table;
      recommend one of the one or more identified data centers; and
      deploy the software system to the recommended data center.

7. The system of claim 6, wherein the end-user location is a geographical location a customer user will be located during execution of the provisioned software system.

8. The system of claim 6, wherein the one or more technical parameters comprise at least one of: availability status of the region; and platform capabilities.

9. The system of claim 6, wherein the first region and the second region may be a same region or a different region.

10. The system of claim 6, wherein in the case the determined number of end-user locations is more than one, executing the processor-executable process steps to cause the system to:
- determine at least one customer user preference; and
- select the data center based on the determined: at least one customer user preference, one or non-technical parameters, and one or more technical parameters.

11. A non-transitory computer-readable medium storing program code, the program code executable by a computer system to cause the computer system to:
- receive a latency table including a measured latency in transmission between a first region and a second region;
- generate a data center assignment table including each of a plurality of end-user locations is assigned to a data center;
- receive a request to provision a software system for one or more end-user locations, wherein the request is received after receipt of the latency table and generation of the data center assignment table;
- determine, based on the request, a number of end-user locations as one end-user location or more than one end-user location;
- determine a region for each end-user location in the determined number of end-user locations, the determination further comprising program code to cause the computer system to:
  - determine one or more weighted non-technical parameters for the determined more than one end user locations, wherein the one or more non-technical parameters comprise at least one of: an amount of customer users per location, a number of transactions planned per location and a customer type; and
  - determine a latency for each end user location and one or more technical parameters;
- identify one or more data centers in the determined region based on the data center assignment table;
- recommend one of the one or more identified data centers;
- deploy the software system to the recommended data center.

12. The medium of claim 11, wherein the one or more technical parameters comprise at least one of: availability status of the region; and platform capabilities.

13. The medium of claim 11, wherein in the case the determined number of end-user locations is more than one, program code to cause the computer system to:
- determine at least one customer user preference; and
- select the data center based on the determined: at least one customer user preference, one or more non-technical parameters, and one or more technical parameters.

* * * * *